(12) United States Patent
Nelson

(10) Patent No.: US 11,402,005 B1
(45) Date of Patent: Aug. 2, 2022

(54) THREE-PASS TORQUE CONVERTER HAVING MULTIPLE FLOW PASSAGES AND SEAL PLATE RETENTION

(71) Applicant: Schaeffler Technologies AG & Co. KG, Herzogenaurach (DE)

(72) Inventor: Kyle Nelson, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/173,306

(22) Filed: Feb. 11, 2021

(51) Int. Cl.
*F16H 45/02* (2006.01)

(52) U.S. Cl.
CPC ....... *F16H 45/02* (2013.01); *F16H 2045/021* (2013.01); *F16H 2045/0215* (2013.01)

(58) Field of Classification Search
CPC .............. F16H 45/02; F16H 2045/021; F16H 2045/0215
See application file for complete search history.

(56) References Cited

U.S. PATENT DOCUMENTS

| | | | | |
|---|---|---|---|---|
| 2,717,673 A | * | 9/1955 | Zeidler | F16H 61/14 192/3.3 |
| 5,129,493 A | * | 7/1992 | Edmunds | F16H 45/02 192/3.21 |
| 10,451,158 B2 | | 10/2019 | Vanni et al. | |
| 2005/0211523 A1 | * | 9/2005 | Takahashi | F16H 45/02 192/3.29 |
| 2017/0211674 A1 | * | 7/2017 | Goleski | F16D 25/10 |

* cited by examiner

*Primary Examiner* — Timothy Hannon

(57) ABSTRACT

A torque converter comprising a cover arranged to receive torque, an impeller having an impeller shell non-rotatably connected to the cover, and a turbine in fluid communication with the impeller and including a turbine shell is provided. In embodiments, the torque converter includes a lock-up clutch including a piston plate, an output hub connected to the turbine shell and arranged to non-rotatably connect to a transmission input shaft, and a seal plate disposed, at least partially, axially between the piston plate and the turbine shell. A connector is arranged to connect the cover, the piston plate and the seal plate to each other, wherein a first chamber is formed at least in part by the piston plate and the seal plate and a second chamber is formed at least in part by the cover, the seal plate, and the piston plate.

16 Claims, 2 Drawing Sheets

THREE-PASS TORQUE CONVERTER HAVING MULTIPLE FLOW PASSAGES AND SEAL PLATE RETENTION

TECHNICAL FIELD

The present disclosure relates generally to torque converters and more specifically to torque converters having multiple flow passages to supply fluid to pressure chambers.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass or lock-up clutch that mechanically couples the turbine shaft to a case of the torque converter to bypass the fluid coupling. Torque converters may have multiple flow passages for clutch apply and release. It is known to use cross-flow hubs for providing flow paths for clutch apply and release pressure chambers. However, these cross-flow hubs may be expensive and add complexity to a torque converter design. Accordingly, it is desirable to provide alternative methods for providing fluid flow paths to pressurized chambers of a torque converter.

SUMMARY

Embodiments of this disclosure provide a torque converter comprising a cover arranged to receive torque, an impeller having an impeller shell non-rotatably connected to the cover, and a turbine in fluid communication with the impeller and including a turbine shell. In embodiments, the torque converter includes a lock-up clutch including a piston plate, an output hub connected to the turbine shell and arranged to non-rotatably connect to a transmission input shaft, and a seal plate disposed, at least partially, axially between the piston plate and the turbine shell, wherein the seal plate is connected to the cover and the piston plate. A connector may be arranged to connect the cover, the piston plate and the seal plate to each other, wherein a first chamber is formed at least in part by the piston plate and the seal plate and a second chamber is formed at least in part by the cover, the seal plate, and the piston plate. A flow plate may be connected to the seal plate and disposed axially between the seal plate and the turbine shell. A through-bore may be bounded in first and second opposite radial directions by the seal plate. In embodiments, a rivet connects the seal plate with the flow plate and the through-bore is defined within the rivet.

In embodiments, the piston plate includes a first opening and the seal plate includes a second opening radially aligned with the first opening. The connector may be disposed within the first opening and the second opening. A first seal and a second seal may be disposed at least partially within the first opening of the piston plate, wherein the first seal is configured to seal a radially outer surface of the connector to the piston plate and the second seal is configured to seal a radially inner surface of the connector to the piston plate. In embodiments, a first leaf spring is disposed on an axial side of the piston plate facing the seal plate and fixed thereto by the connector and a second leaf spring is disposed on an axial side of the seal plate facing the piston plate and fixed thereto by the connector. The connector may further be fixed to the cover on one end and fixed to the seal plate on another, opposite end. The connector may be fixed to the cover via welding.

In embodiments, the seal plate is further fixed to an innermost end of the cover. A first flow path may be configured to provide fluid to the first chamber, wherein the first flow path includes a portion bounded in part by the seal plate and the flow plate. A second flow path may be configured to provide fluid to the second chamber, wherein the second flow path passes through the through-bore and includes a portion bounded in part by the flow plate and the output hub. In embodiments, the first flow path is sealed from the second flow path and the first flow path does not pass through the through-bore. The seal plate may also include an opening extending axially therethrough and the first flow path passes through the opening into the first chamber.

In embodiments, for a lock-up mode the piston plate is non-rotatably connected to the cover and pressurized fluid is arranged to flow through the first flow path into the first chamber to displace the piston plate in an axial direction toward the cover. In other embodiments, for a torque converter mode pressurized fluid is arranged to flow through the second flow path passing through the through-bore into the second chamber to displace the piston plate in an axial direction away from the cover to disconnect the piston plate from the cover. In embodiments, an inner end of the cover is connected to the seal plate and the seal plate is further connected to the piston plate at an outer diameter thereof.

Embodiments disclosed herein provide the advantageous benefit of reduced costs and complexity of three-pass torque converters, for example, by removing a hub that is typically used to direct flow to appropriate apply and cooling circuits. Furthermore, embodiments disclosed herein offer design advantages by creating a cross-flow configuration without any forgings or costly cross drilling operations. Moreover, embodiments disclosed herein allow for use of a twin plate clutch design, which requires higher clutch load.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
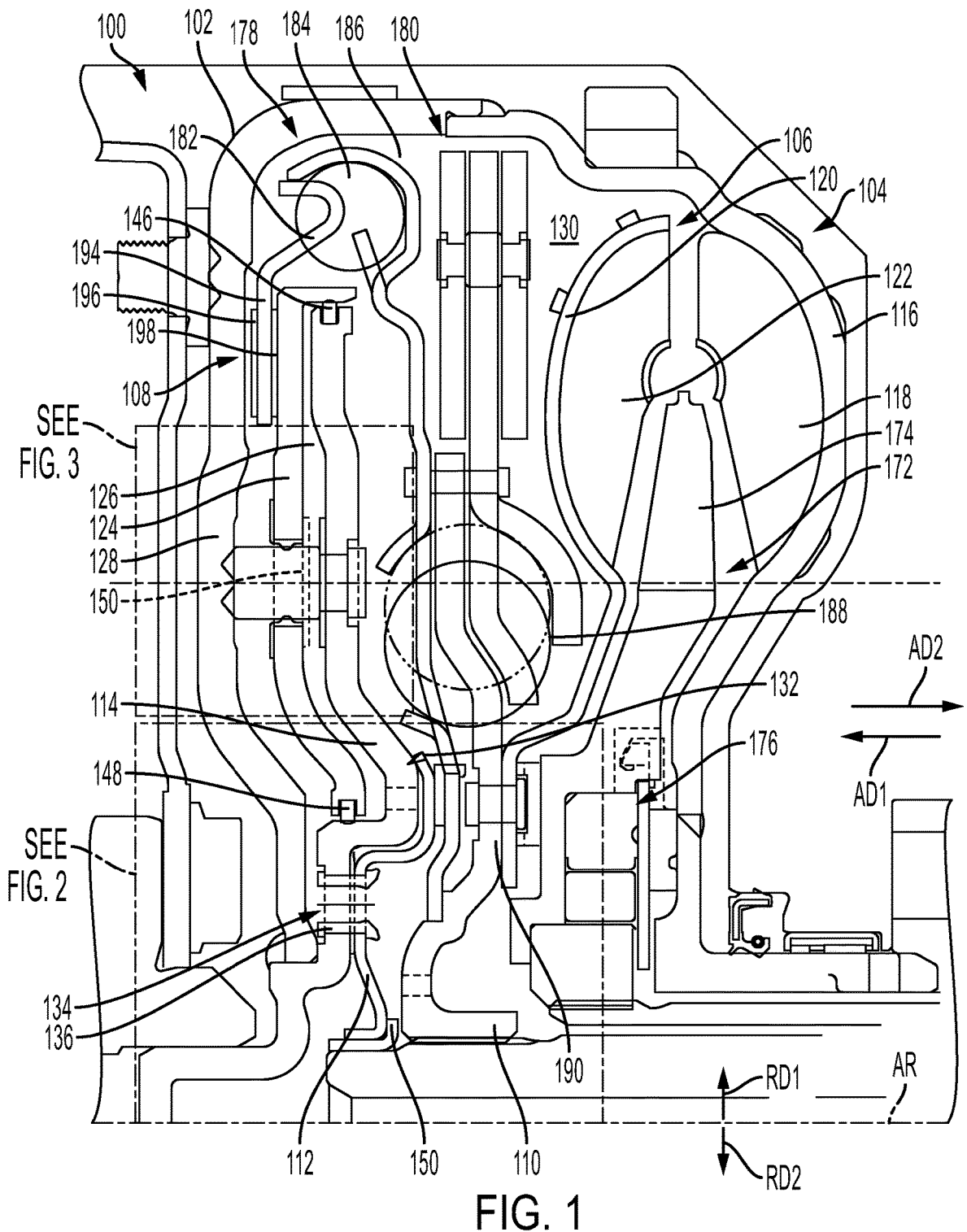
FIG. 1 is a cross-sectional view of a torque converter configured for cross flow to pressure chambers according to an embodiment of the present disclosure.
Figure 2:
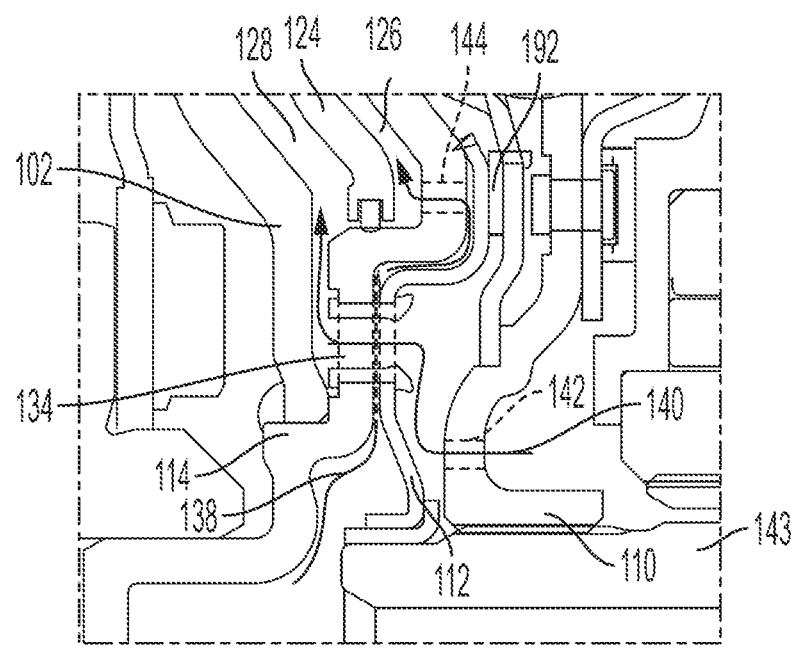
FIG. 2 is an enlarged view of an area of the torque converter shown in FIG. 1 showing cross flow to pressure chambers.
Figure 3:
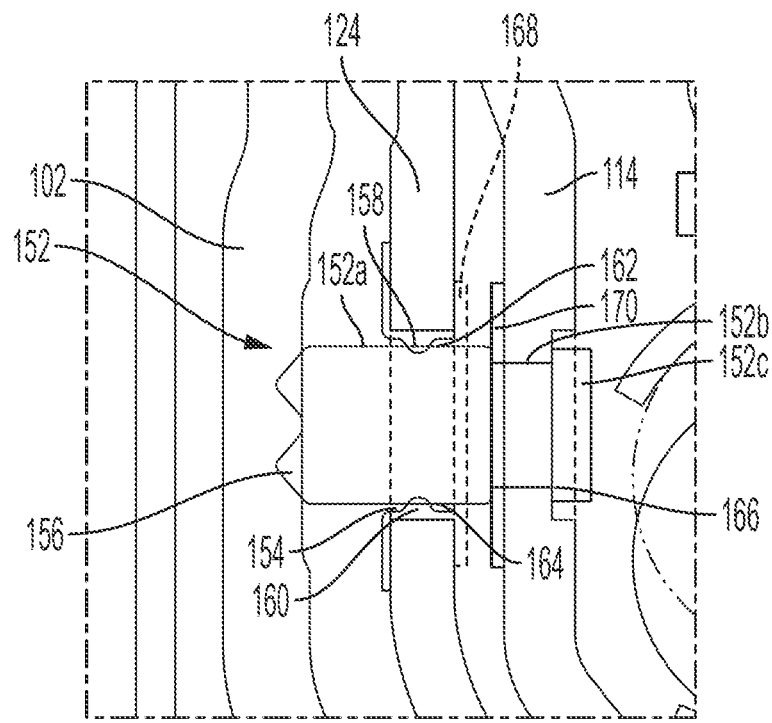
FIG. 3 is an enlarged view of an area of the torque converter shown in FIG. 1 showing a seal plate retention arrangement.

FIG. 1 shows a torque converter 100 in accordance with an embodiment of the present disclosure. FIG. 2 shows an enlarged view of an area of torque converter 100 showing cross flow into pressure chambers. FIG. 3 shows an enlarged view of an area of torque converter 100 showing a seal plate retention arrangement. The following description is made with reference to FIGS. 1-3. Torque converter 100 includes: axis of rotation AR; cover 102 arranged to receive torque; impeller 104; turbine 106; lock up clutch 108; output hub 110; flow plate 112; and seal plate 114 non-rotatably connected to cover 102. Impeller 104 includes: impeller shell 116 non-rotatably connected to cover 102; and at least one impeller blade 118. Turbine 106 includes: turbine shell 120 non-rotatably connected to hub 110; and at least one turbine blade 122. Lock-up clutch 108 includes piston plate 124. Torque converter 100 includes: apply chamber 126; release chamber 128; and chamber 130. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

Flow plate 112 is non-rotatably connected to seal plate 114. For example, flow plate 112 may be fixed to seal plate 114 by weld 132 at a radially outer end. However, it is to be understood that other connection methods may be employed, such as use of an O-ring, steel-steel connection, or a gasket. Chamber 126 is bounded, at least in part, by piston plate 124 and seal plate 114. Chamber 128 is bounded, at least in part, by cover 102, seal plate 114, and piston plate 124. Chamber 130 is bounded, at least in part, by seal plate 114 and shell 116. By "bounded in part," we mean that a portion of the cited chamber, flow path, or other structure is bounded, or formed, by the cited element.

Seal plate 114 includes through-bore 134 bounded in opposite radial directions RD1 and RD2, orthogonal to axis AR, by seal plate 114. Through-bore bore 134 is further defined by flow plate 112 and is also bounded in opposite radial directions RD1 and RD2 by flow plate 112. In an example embodiment: torque converter 100 includes rivet 136 connecting seal plate 114 and flow plate 112, wherein through-bore 134 passes through, or is defined within, rivet 136. Torque converter 100 includes flow path 138 and flow path 140. Flow path 140 is sealed from flow path 138 and includes, that is, passes through, through-bore 134. That is, flow path 140 includes through-bore 134. Flow path 138 does not pass through through-bore 134. Flow path 140 further includes, that is, passes through opening 142 defined in hub 110. That is, pressurized fluid may flow through opening 142 and through-bore 134 into chamber 128. Flow path 140 may further be bounded, at least in part, by flow plate 112 and hub 110. Flow path 138 is bounded, at least in part, by seal plate 114 and flow plate 112. That is, flow path 138 passes or flows between seal plate 114 and flow plate 112. Seal plate 114 and/or flow plate 112 may include grooves for flow therebetween. Flow path 138 passes through opening 144 defined in seal plate 114 that opens into apply chamber 126. That is, pressurized fluid may be supplied from transmission input shaft 143 to flow path 138 extending between seal plate 114 and flow plate 112 through opening 144 into apply chamber 126. In this way, flow path 138 includes, and passes through, opening 144.

For a lock-up mode for torque converter 100, in which piston plate 124 is non-rotatably connected to cover 102 and the torque is transmitted to hub 110 through clutch 108, Pressurized fluid is arranged to flow through flow path 138, and passing through opening 144, into apply chamber 126 to displace piston plate in axial direction AD1 to connect piston plate 124 with cover 102 bypassing the hydrodynamic fluid coupling. For a torque converter mode for torque converter 100, in which cover 102 is rotatable with respect to piston plate 124 and the torque bypasses clutch 108, pressurized fluid is arranged to flow through flow path 140, including passing through opening 142 and through-bore 134, into release chamber 128 to displace piston plate 124 in axial direction AD2, opposite direction AD1, to disconnect piston plate 124 from cover 102.

In an example embodiment, torque converter 100 includes seals 146, 148. Seal 146 seals an outer diameter of seal plate 114 to an outer end of piston plate 124 and seal 148 seals an inner diameter of piston plate 124 to seal plate 114. Seal plate 114 is disposed, at least partially, axially between piston plate 124 and turbine shell 120. Seal plate 114 further includes a portion axially aligned with piston plate 124. That is, a line orthogonal to axis of rotation AR and passing through that portion of seal plate 114 would also pass through a portion of piston plate 124. Seal plate 114 may further be connected to an inner diameter or innermost end of cover 102. Flow plate 112 may further be piloted on input shaft 143 via bushing 150.

Piston plate 124 is further connected to seal plate 114 and cover 102 by connector 152. Connector 152 may include: body portion 152a, body portion 152b, and head portion 152c wherein body portion 152b is disposed axially between body portion 152a and head portion 152c. Piston plate 124 may include opening 154 extending axially therethrough and body portion 152a may be disposed, or received, at least partially within opening 154. Body portion 152a may further be fixed to cover 102 on one end, for example, via welds 156. Seals 158 and 160 may be disposed, at least partially, within opening 154 to seal radially outer surface 162 and radially inner surface 164 to piston plate 124, respectively. A plurality of connectors 152 may be used to fix cover 102, piston plate 124 and seal plate 114 and are arranged and configured to allow for flow between and around them within chambers 126 and 128.

Seal plate 114 further includes opening 166 and body portion 152b is arranged to be disposed, or received, within opening 166. Head portion 152c is further arranged and configured to overlap a portion of seal plate 114 to fix seal plate 114 to piston plate 124 and cover 102. Head portion 152c may be formed by riveting, for example. Leaf spring 168 is arranged on an axial side of piston 124 facing seal plate 114 and fixed thereto by connector 152. Leaf spring 170 is arranged on an axial side of seal plate 114 facing piston plate 124 and fixed thereto by connector 152. In this way, connector 152 fixes cover 102, piston plate 124, leaf springs 168, 170 and seal plate 114 together. Leaf springs 168, 170 connecting to connector 152 rotationally fix piston plate 124 thereto and connector 152 is fixed to cover 102 to react pressure loads resulting from clutch apply conditions.

In an example embodiment, torque converter 100 includes: stator 172 with at least one stator blade 174; one-way clutch 176; torsional vibration damper 178; and pendulum vibration absorber 180. Damper 178 includes input plate 182, at least one spring 184, spring retainer plate 186, at least one spring 188, and output flange 190. Spring 184 is engaged with plates 182 and 186. Spring 188 is engaged with plate 186 and flange 190. Absorber 180 is connected to plate 186 and flange 190 is connected to hub 110. Flange 190 may be formed integrally with hub 110. That is, flange 190 and output hub 110 may be formed as a single piece. Turbine shell 120 may be connected to flange 190, for example, via a riveted connection. Plate 186 may be centered on flange 190 and/or hub 110. Washer 192 may be disposed between flow plate 112 and plate 186 and clipped to plate 186.

In an example embodiment, clutch 108 includes clutch plate 194 axially disposed between cover 102 and piston plate 124. Clutch plate 194 is non-rotatably connected to plate 182 and connected to spring 184. Friction material 196 may be disposed between, and affixed to one of, cover 102 and clutch plate 194. Friction material 198 may be disposed between, and affixed to one of, clutch plate 194 and piston plate 124.

Embodiments according to the present disclosure provide various advantages including cost reductions by creating a cross flow configuration without any forgings or costly cross drilling operations.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 torque converter
102 cover
104 impeller
106 turbine
108 lock-up clutch
110 output hub
112 flow plate
114 seal plate
116 impeller shell
118 impeller blade
120 turbine shell
122 turbine blade
124 piston plate
126 apply chamber
128 release chamber
130 chamber
132 weld
134 through-bore
136 rivet
138 flow path
140 flow path
142 opening
143 transmission input shaft
144 opening
146 seal
148 seal
150 bushing
152 connector
152a body portion
152b body portion
152c head portion
154 opening
156 welds
158 seals
162 radially outer surface
164 radially inner surface
166 opening
168 leaf spring
170 leaf spring
172 stator
174 stator blade
176 one-way clutch
178 torsional vibration damper
180 pendulum vibration absorber
182 input plate
184 spring
186 spring retainer plate
188 spring
190 output flange
192 washer
194 clutch plate
196 friction material
198 friction material

What is claimed is:

1. A torque converter, comprising:
a cover arranged to receive torque;
an impeller having an impeller shell non-rotatably connected to the cover;
a turbine in fluid communication with the impeller and including a turbine shell;
a lock-up clutch including a piston plate;
an output hub connected to the turbine shell and arranged to non-rotatably connect to a transmission input shaft;
a seal plate disposed, at least partially, axially between the piston plate and the turbine shell; and
a connector arranged to connect the cover, the piston plate and the seal plate to each other, wherein a first chamber is formed at least in part by the piston plate and the seal plate and a second chamber is formed at least in part by the cover, the seal plate, and the piston plate, wherein the piston plate includes a first opening and the seal plate includes a second opening radially aligned with the first opening, the connector being disposed within the first opening and the second opening.

2. The torque converter according to claim 1, further comprising a first seal and a second seal disposed at least partially within the first opening of the piston plate, wherein the first seal is configured to seal a radially outer surface of the connector to the piston plate and the second seal is configured to seal a radially inner surface of the connector to the piston plate.

3. The torque converter according to claim 1, further comprising a first leaf spring disposed on an axial side of the piston plate facing the seal plate and fixed thereto by the connector.

4. The torque converter according to claim 3, further comprising a second leaf spring disposed on an axial side of the seal plate facing the piston plate and fixed thereto by the connector.

5. The torque converter according to claim 1, wherein the connector is fixed to the cover on one end and fixed to the seal plate on an other, opposite end.

6. The torque converter according to claim 5, wherein the connector is fixed to the cover via welding.

7. The torque converter according to claim 1, wherein the seal plate is further fixed to an innermost end of the cover.

8. The torque converter according to claim 1, further comprising:
- a flow plate connected to the seal plate and disposed axially between the seal plate and the turbine shell; and
- a through-bore bounded in first and second opposite radial directions by the seal plate.

9. The torque converter according to claim 8, further comprising:
- a first flow path configured to provide fluid to the first chamber, wherein the first flow path includes a portion bounded in part by the seal plate and the flow plate; and
- a second flow path configured to provide fluid to the second chamber, wherein the second flow path passes through the through-bore and includes a portion bounded in part by the flow plate and the output hub.

10. The torque converter according to claim 9, wherein the first flow path is sealed from the second flow path.

11. The torque converter according to claim 9, wherein the first flow path does not pass through the through-bore.

12. The torque converter according to claim 9, wherein the seal plate includes an opening extending axially therethrough and the first flow path passes through the opening into the first chamber.

13. The torque converter according to claim 9, wherein for a lock-up mode the piston plate is non-rotatably connected to the cover and pressurized fluid is arranged to flow through the first flow path into the first chamber to displace the piston plate in an axial direction toward the cover.

14. The torque converter according to claim 9, wherein for a torque converter mode pressurized fluid is arranged to flow through the second flow path passing through the through-bore into the second chamber to displace the piston plate in an axial direction away from the cover to disconnect the piston plate from the cover.

15. The torque converter according to claim 9, wherein a rivet connects the seal plate with the flow plate and the through-bore is defined within the rivet.

16. A torque converter, comprising:
- a cover arranged to receive torque;
- an impeller having an impeller shell non-rotatably connected to the cover;
- a turbine in fluid communication with the impeller and including a turbine shell;
- a lock-up clutch including a piston plate;
- an output hub connected to the turbine shell and arranged to non-rotatably connect to a transmission input shaft;
- a seal plate disposed, at least partially, axially between the piston plate and the turbine shell; and
- a connector arranged to connect the cover, the piston plate and the seal plate to each other, wherein the piston plate includes a first opening and the seal plate includes a second opening radially aligned with the first opening, wherein the connector is disposed within the first opening and the second opening.

* * * * *